United States Patent Office 2,909,568
Patented Oct. 20, 1959

2,909,568

METHYLATION OF HYDROXYAROMATIC COMPOUNDS

William K. T. Gleim, Island Lake, Ill., assignor, by mesne assignments, to Universal Oil Products Company, Des Plaines, Ill., a corporation of Delaware No Drawing. Application September 5, 1957
Serial No. 682,096

6 Claims. (Cl. 260—613)

This invention relates to a process for the production of methyl-substituted hydroxyaromatic compounds, and more particularly relates to a process for the production of methyl-substituted phenolic compounds. Still more particularly, this invention relates to a combination process for the production of methyl-substituted phenolic compounds which comprises reacting a phenol with formaldehyde and reducing the thus produced hydroxymethylated phenol with hydrogen in the presence of a catalyst comprising a platinum group metal support on a solid adsorbent.

Prior art processes relating to the production of methyl-substituted hydroxyaromatic compounds have ordinarily been carried out by mineral acid catalysis, or by Friedel-Crafts reactions or extensions thereof. Because of the nature of the catalysts utilized in these acidic reactions, high yields of desired methylated hydroxyaromatic compounds have not been attainable. In addition to obtaining alkylated products, large portions of the alkylating agents have been consumed by decomposition to fragmental materials and reaction of such fragments with these acid catalysts. It has also been proposed to carry out the preparation of methyl-substituted hydroxyaromatic compounds at high temperatures in the presence of various acid-acting solids such as clays, silica-alumina composites, etc. While such high temperature methods are applicable to the preparation of certain methyl-substituted derivatives of aromatic compounds, they are not applicable to phenols. Furthermore, it is often desirable to introduce methyl substituents into hydroxyaromatic compounds which in addition to containing a free hydroxyl group also contain alkoxy groups attached to the aromatic nucleus. These alkoxy groups are unstable at high temperatures and the ether linkage is cleaved. Therefore, high temperature processes are inapplicable for the preparation of methyl-substituted hydroxy-aromatic compounds and hydroxy aromatics containing an alkoxy group attached to the aromatic nucleus. These and other disadvantages are overcome by the utilization of the process of the present invention in which high yields of desired methyl-substituted aromatic compounds are produced with minimum loss of starting materials.

The methyl-substituted hydroxyaromatic compounds produced by the process of this invention have many uses. Some of them are widely used as antioxidants to prevent the oxidative deterioration of organic substrates subject to said deterioration, for example, gasoline, lard, lubricating oil, rubber, etc. In addition, certain of them have recently found wide use in preventing deterioration of rubber due to ozone in the atmosphere. For example, 2,6-dimethoxy-4-methyl phenol has recently been found to be a very potent antiozonant for rubber. This compound can be readily produced by utilization of the hereinafter described process. The compounds of the present invention are also useful as intermediates in the preparation of diverse substances including pharmaceuticals, lubricating oil additives, etc.

One embodiment of the present invention relates to a process for the production of methyl-substituted hydroxyaromatic compounds which comprises reacting a hydroxyaromatic compound containing at least one hydrogen atom attached to a nuclear carbon atom with formaldehyde under mildly basic pH conditions to produce a hydroxymethyl-hydroxyaromatic compound, reducing said hydroxymethyl-hydroxyaromatic compound with hydrogen at reduction conditions including pressure and elevated temperature in the presence of a catalyst comprising a platinum group metal supported on a solid adsorbent, and recovering the methyl-substituted hydroxyaromatic compound.

Another embodiment of the present invention relates to a process for the production of methyl-substituted phenolic compounds which comprises reacting a phenol compound containing at least one hydrogen atom attached to a nuclear carbon atom with formaldehyde under conditions of pH ranging from about 7.0 to about 10.0 to produce a hydroxymethyl-phenol compound, reducing said hydroxymethyl-phenol compound with hydrogen at reduction conditions including a pressure of from about 50 atmospheres to about 200 atmospheres and a temperature of from about 100° to about 225° C. in the presence of a catalyst comprising a platinum group metal supported on a solid adsorbent, and recovering a methyl-substituted phenol compound.

A further embodiment of the present invention relates to a process for the production of methyl-substituted phenolic compounds which comprises reacting a phenol compound containing at least one hydrogen atom attached to a nuclear carbon atom with formaldehyde under conditions of pH ranging from about 7.0 to about 10.0 to produce a hydroxymethylphenol compound, reducing said hydroxymethyl-phenol compound with hydrogen at reduction conditions including a pressure of from about 50 atmospheres to about 200 atmospheres and a temperature of from about 100° to about 225° C. in the presence of a catalyst comprising alumina containing from about 0.01 weight percent to about 2.0 weight percent platinum, and recovering the methyl-substituted phenol compound.

A specific embodiment of the present invention relates to a process for the production of creosol which comprises reacting guaiacol with formaldehyde under conditions of pH ranging from about 7.0 to about 10.0 to produce vanillyl alcohol, reducing the vanillyl alcohol with hydrogen at reduction conditions including a pressure of from about 50 atmospheres to about 200 atmospheres and a temperature of from about 100° to about 225° C. in the presence of a catalyst comprising alumina containing from about 0.01 weight percent to about 2.0 weight percent platinum, and recovering creosol.

As set forth hereinabove, the process of the present invention involves two separate reaction steps, that is, reaction of formaldehyde with the selected hydroxyaromatic compound, and reduction of the thus produced hydroxymethylaromatic compound. The first reaction step therefore involves utilization of a hydroxyaromatic compound. Various hydroxyaromatic compounds are suitable for use in the process of this invention with the limitation that the aromatic nucleus must contain at least one hydrogen atom attached to a nuclear carbon atom. Compounds such as pentamethyl phenol are thus inoperative and are excluded from the scope of this invention. Utilizable hydroxyaromatic compounds include phenol, catechol, resorcinol, hydroquinone, guaiacol, meta-methoxy phenol, para-methoxy phenol, ortho-ethoxy phenol, meta-ethoxy phenol, para-ethoxy phenol, and other monoalkyl ethers, monoaralkyl ethers, monoaryl ethers, and monoalkaryl ethers of "so called" dihydric phenols, ortho-chloro phenol, meta-chloro phenol, para-chloro phenol, ortho-bromo phenol, meta-bromo phenol, para-bromo phenol, ortho-cresol, meta-cresol, para-cresol, ortho-ethyl phenol, meta-ethyl phenol, para-ethyl phenol, ortho-n-propyl phenol, meta-n-propyl phenol, para-n-propyl phenol, ortho-isopropyl phenol, meta-isopropyl phenol, para-isopropyl phenol, and other monoalkyl phenols, monocycloalkyl phenols, monoaralkyl phenols, monoaryl phenols, monoalkaryl phenols, etc. The above enumerated hydroxyaromatic compounds include those containing respectively 5 and 4 hydrogen atoms attached to nuclear carbon atoms. Examples of utilizable hydroxyaromatic compounds containing 3 hydrogen atoms attached to 3 nuclear carbon atoms include pyrogallol, hydroxy hydroquinone, phloroglucinol, ortho-methoxy catechol, 2,3-dimethoxy phenol, 2,6-dimethoxy phenol, 3-methoxy catechol, 4-methoxy guaiacol, 5-methoxy guaiacol, 4-methoxy resorcinol, methoxy hydroquinone, 4-methoxy catechol, 5-methoxy resorcinol, 3,4-dimethoxy phenol, 2,5-dimethoxy phenol, 2,4-dimethoxy phenol, 3,5-dimethoxy phenol, and other monoalkyl, monoaryl, dialkyl, diaryl, etc., ethers of the so-called trihydric phenols, ortho-chloro catechol, meta-chloro catechol, 4-chloro resorcinol, 5-chloro resorcinol, chlorohydroquinone, 2-chloro resorcinol, ortho-bromo catechol, meta-bromo catechol, 4-bromo resorcinol, 5-bromo resorcinol, bromohydroquinone, etc., ortho-methyl guaiacol, meta-methyl guaiacol, 2-methyl resorcinol, 4-methyl resorcinol, 5-methyl resorcinol, methyl hydroquinone, and other monoalkyl, monoaralkyl, monocycloalkyl, monoaryl, monoalkaryl derivatives of the so-called dihydric phenols, 2,3-dichloro phenol, 2,4-dichloro phenol, 2,5-dichloro phenol, 2,6-dichloro phenol, 3,4-dichloro phenol, 3,5-dichloro phenol, 2,3-dibromo phenol, 2,4-dibromo phenol, 2,5-dibromo phenol, 2,6-dibromo phenol, 3,4-dibromo phenol, 3,5-dibromo phenol, etc., xylenols including 2,3-dimethyl phenol, 2,4-dimethyl phenol, 2,5-dimethyl phenol, 2,6-dimethyl phenol, 3,4-dimethyl phenol, 3,5-dimethyl phenol, and other dialkyl, dicycloalkyl, diaryl, dialkaryl, diaralkyl, etc. phenols. Suitable hydroxyaromatic compounds having only two hydrogen atoms attached to nuclear carbon atoms include ortho-methyl pyrogallol, meta-methyl pyrogallol, gallic acid, 1,2,3,4-tetrahydroxy benzene, 1,2,3,5-tetrahydroxy benzene, 1,2,4,5-tetrahydroxy benzene, monomethyl ethers of these compounds, dimethyl ethers thereof, etc. An example of a utilizable hydroxyaromatic compound having only one hydrogen atom attached thereto is 4,5-dimethyl pyrogallol. Likewise, its monomethyl and dimethyl ethers can be utilized. While the above mentioned compounds contain only one aromatic nucleus and are thus representative of phenolic compounds, hydroxyaromatic compounds containing more than one aromatic nucleus may be utilized. Such compounds include alpha-naphthol, beta-naphthol, dihydroxy-naphthalenes such as 1,5-dihydroxy-naphthalene, 1,8-dihydroxy-naphthalene, 2,3-dihydroxy-naphthalene, 2,7-dihydroxy-naphthalene, alpha-anthrol, beta-anthrol, 9-anthrol, phenanthrol, etc. The hydroxyaromatic compounds which are utilizable within the broad scope of this invention may be represented by the following generic formula:

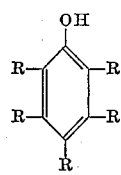

in which R is independently selected from among hydrogen, alkyl, aryl, alkaryl, aralkyl, cycloalkyl, alkylcycloalkyl, hydroxy, alkoxy, aroxy, aralkoxy, alkaroxy, cycloalkoxy, and halogen, and in which at least one R is hydrogen. Adjacent R's may be joined by a single or double bond forming a 5 or 6 carbon atom ring as an aromatic or naphthenic ring system.

The utilizable hydroxyaromatic compound containing at least one hydrogen atom attached to a nuclear carbon atom is reacted with formaldehyde under mildly basic pH conditions. While the hydroxyaromatic compound may be utilized as such, it is often advantageous and/or desirable to utilize it in this reaction in the form of its monoalkali or alkaline earth metal salt. These alkali or alkaline earth metal salts are formed by reaction of the hydroxyaromatic compound with an equimolecular proportion of sodium or potassium hydroxide, or alkaline earth metal hydroxide, ordinarily in the form of an aqueous solution thereof, although alcoholic solutions such as methanolic potassium hydroxide may be utilized.

This alkali metal salt of a hydroxyaromatic compound is reacted with formaldehyde or a polymer thereof. Since formaldehyde is a gas at ordinary conditions of temperature and pressure, it is usually utilized as an aqueous solution, that obtainable commercially being entirely satisfactory. Formaldehyde is usually obtained commercially as a 38% solution in water. Formaldehyde is also very soluble in lower molecular weight alcohols such as ethanol, and is soluble in ethyl ether and solutions of formaldehyde in these solvents may also be utilized. Similarly, meta-formaldehyde (alpha-trioxymethylene) or para-formaldehyde may be satisfactorily utilized in the process of this invention.

In reacting the formaldehyde with the hydroxyaromatic compound containing at least one hydrogen atom attached to a nuclear carbon atom, the compounds are usually admixed such that at least a molar equivalent of formaldehyde is utilized. When it is desired to introduce more than one hydroxy methyl group into the selected hydroxyaromatic compound, additional molar equivalents of formaldehyde are utilized. Often it is advantageous and/or desirable to utilize more than one molar equivalent of formaldehyde per molar equivalent of hydroxyaromatic compound when it is desired to introduce just one hydroxymethyl group into the hydroxyaromatic compound, and the use of more than one molar equivalent of formaldehyde is thus within the use of the generally broad scope of this invention. The reaction of formaldehyde with the hydroxyaromatic compound is carried out at atmospheric pressure in liquid phase although higher pressures such as are attained in the use of apparatus for continuous flow processes can be utilized with no adverse effect, but with no additional advantage. The reaction of formaldehyde with the hydroxyaromatic compound takes place readily at room temperature although temperatures of from about 0° C. to about 100° C. can be used. In carrying out the reaction it is only necessary to utilize a temperature under that at which the formaldehyde and hydroxyaromatic compound will be condensed. The reaction is a relatively slow one at ambient temperature and thus reaction times of from about 5 to about 100 hours or more are used. At the higher temperatures these reaction times are shorter and thus when it is desired to accelerate the rate at which the reaction takes place, temperatures in the higher portion of the above described range are utilized.

The reaction of formaldehyde with a hydroxyaromatic compound is preferably carried out at a mildly basic pH. This pH may vary from about 7.0 to about 10.0. Lower or higher pH's cause undesired reactions such as copolymerization of the formaldehyde with the hydroxyaromatic compounds to form resinous products. Since hydroxyaromatic compounds, particularly phenolic compounds, are slightly acidic, in order to neutralize them and to provide a slightly basic pH, it is often necessary to utilize them in the form of their alkali or alkaline earth metal salts in this step in the process of the present invention. As set forth hereinabove, mildly basic pH conditions are preferred so that the pH of the reactant solution of hydroxyaromatic compound and formaldehyde will be in the range of from about 7.0 to about 10.0. This pH condition can be maintained or established in two different manners. First, a slight excess of alkali metal hydroxide can be utilized in the preparation of the alkali metal salt of the hydroxyaromatic compound so that the resultant solution will have the desired mildly basic pH. In another manner, this pH condition can be attained and maintained by the utilization of suitable basic buffers such as sodium acetate, sodium citrate, sodium carbonate, sodium borate, sodium aluminate, trisodium phosphate, potassium acetate, potassium carbonate, potassium citrate, potassium oxylate, tripotassium phosphate, potassium tetrate, etc.

After the passage of the desired period of time at the mildly basic pH and at the temperature selected, the hydroxymethyl-hydroxyaromatic compound produced by the reaction of formaldehyde with a hydroxyaromatic compound is isolated from unreacted starting materials. The unreacted starting materials may be recycled for further use in the process. Since the hydroxyaromatic compound is preferably utilized in the form of its alkali metal salt, the hydroxymethyl-hydroxyaromatic compound formed in the reaction will be an alkali metal salt thereof and neutralization in free state is necessary to obtain the hydroxymethyl-hydroxyaromatic compound in free state. This can be readily accomplished by pouring the alkali metal salt of the hydroxymethyl-hydroxyaromatic compound into acid, cooling with ice if necessary, and the precipitate which is formed is filtered and may be recrystallized if so desired. Acids which are used for this neutralization include mineral acids such as hydrochloric acid, sulfuric acid, etc. and carboxylic acids such as acetic acid, etc.

In the next step in the process of the present invention the hydroxymethyl-hydroxyaromatic compound is reduced with hydrogen at reduction conditions including pressure and elevated temperature in the presence of a catalyst comprising a platinum group metal supported on a solid adsorbent. To obtain satisfactory reduction, the solid hydroxymethyl-hydroxyaromatic compound is usually dissolved in a suitable solvent for maximum contact with the catalyst in the presence of hydrogen at the specified reduction conditions. Suitable solvents include alcohols such as methanol, ethanol, n-propanol, isopropanol, etc., liquid paraffinic hydrocarbons such as pentane, hexane, heptane, octane, etc., and mixtures thereof, aromatic hydrocarbons such as benzene, toluene, xylenes, ethers such as diethyl ether, etc. Of the above solvents, the alcohols are preferred, and particularly preferred is methanol.

The hydrogen utilized for the reduction may be in pure form or may be diluted with various inert diluents including nitrogen, methane, ethane, etc. The reduction of the hydroxymethyl group in the hydroxymethyl-hydroxyaromatic compound to a methyl group is carried out under reduction conditions including pressure and elevated temperature. The pressure may vary from about 50 atmospheres to about 200 atmospheres or more depending upon the particular apparatus available for carrying out the reduction step. The reduction takes place more rapidly at the higher pressures within the above-mentioned range. Due to the utilization of the particular catalyst hereinafter described for this reduction, hydrogenation of the aromatic nucleus does not take place and thus the higher pressures within the above range are somewhat more advantageous. The reduction temperature is elevated above ambient temperature and preferably within the range of from about 100° to about 225° C. Satisfactory reduction at rapid rate takes place within this range. In the preferred embodiment of this invention the hydroxyaromatic compound utilized contains as a substituent thereon an alkoxy group. Since the alkoxy linkage is split at temperatures above about 225° C., temperatures above this higher limit are to be avoided. Residence times in batch type operations of from about one to about 24 hours or more are satisfactory.

As set forth hereinabove, this reduction of a hydroxymethyl-hydroxyaromatic compound to a methyl-substituted hydroxyaromatic compound is carried out in the presence of a catalyst comprising a platinum group metal supported on a solid adsorbent. The platinum group metals which may be utilized successfully include platinum, palladium, ruthenium, rhodium, osmium, and iridium. Of these metals, platinum and palladium are preferred and of these two preferred metals, platinum is particularly preferred. These platinum group metals on a solid support for use as catalysts in this process have the advantage that hydrogenation of the aromatic nucleus does take place. Prior art catalysts such as nickel which have been previously proposed for use for this reaction saturate the aromatic nucleus at the temperatures and pressures hereinabove disclosed for this reaction. Suitable solid supports for the platinum group metals include various refractory oxides such as silica, alumina, silica-alumina, silica-magnesia, silica-zirconia, silica-alumina-magnesia, silica-alumina-zirconia, chromia-alumina, and various clays such as kaolin, or bentonite which may or may not have been previously acid treated. Other suitable solid supports include charcoals which may be derived from animal, vegetable, or mineral sources. The platinum group metals may be added to or impregnated on these solid supports by various procedures. One satisfactory method comprises forming an aqueous solution of the salt of the platinum group metal and pouring this aqueous solution over the support after which the mixture is allowed to stand until the salt of the platinum group metal has been adsorbed on the solid support. The solid support containing the salt of the platinum group metal is then drained, dried, and calcined to decompose the salt. After such a procedure, the solid adsorbent containing an oxide of the platinum group metal is reduced prior to use with hydrogen to obtain the platinum group metal on the solid support. The quantity of the platinum group metal which is impregnated on the solid support may vary from about 0.01% to about 10% or more by weight. For economic reasons it is usually preferred to utilize quantities in the lower portion of the above-described range. Thus with the preferred platinum group metal, the catalyst will contain preferably from about 0.1 to about 2.0 weight percent platinum. Palladium is not quite as active a reduction catalyst as platinum for this reaction and when palladium is utilized on a solid support as the reduction catalyst, the amount of palladium will range from about 0.5 to about 5% or more by weight.

The process of the present invention can be carried out in either a batch or continuous type operation. In a simple batch type operation, the hydroxyaromatic compound, for example guaiacol, is charged along with greater than an equimolecular proportion of formaldehyde to an open vessel equipped with heating and cooling means. The reactants are stirred at ambient temperature for a preselected period of time, for example, 24 hours. The pH of the reactant solution is maintained by adding slightly more than a molar equivalent quantity of 10% sodium hydroxide solution based on the quantity of guaiacol used. The vanillyl alcohol which is formed separates as the sodium salt thereof and is removed by filtration. It is recrystallized from a benzene-ethanol mixture and after recrystallization, the vanillyl alcohol is charged to a pressure vessel in solution in methanol. About 10% by weight of alumina containing 0.4% platinum is added, the vessel is closed, pressured to 75 atmospheres with hydrogen, and heated to 150° C. After 8 hours time the vessel is opened and the desired 2-methoxy-4-methyl phenol isolated from the effluent by conventional means.

The reaction may also be carried out in a continuous manner by continuously charging guaiacol and formaldehyde to suitable mixing equipment equipped with means for maintaining the reactants in contact with one another for the desired period of time. A portion of the circulating reaction zone liquid is continuously withdrawn and after isolation of the hydroxymethyl-hydroxyaromatic compound may be continuously passed as a solution over a fixed bed of the selected catalyst maintained under suitable conditions of temperature and pressure. Details of processes of this general type are well known to those skilled in the art.

This invention is further illustrated by the following examples which are introduced solely for the purpose of illustration and with no intention of unduly limiting the scope of the same.

Example I

This example illustrates the process of this invention in the preparation of creosol by the reaction of guaiacol with formaldehyde to form vanillyl alcohol, followed by reduction of said vanillyl alcohol to creosol. The first step for this reaction is the admixing of 124 g. of guaiacol and 405 g. of 10% sodium hydroxide solution in water. The sodium salt of guaiacol precipitates and is dispersed by mixing. The pH of the solution is about 9.0. To this dispersed solution of the sodium salt is now added 80 g. 38% formaldehyde. This reaction mixture is stirred at room temperature for 72 hours, after which time it is poured over 1 kilogram of ice containing 75 g. of concentrated sulfuric acid. From this water-ice solution a precipitate forms which is crude vanillyl alcohol. This is removed by filtration, dried, and recrystallized from a mixture of benzene and ethanol. The recrystallized material has a melting point of about 110–112° C. About 75 g. of the recrystallized vanillyl alcohol is obtained.

Fifty g. of the thus produced vanillyl alcohol was dissolved in 450 g. of methyl alcohol and charged to a one liter rotating autoclave along with 50 g. of a catalyst comprising alumina containing 0.375% platinum. The autoclave was sealed, and hydrogen was introduced under pressure until a pressure of 100 atmospheres had been reached. The autoclave was then heated to a temperature of 160° C. and rotated for 5½ hours. After cooling and release of the pressure on the autoclave, the methyl alcohol solution of the product was decanted from the catalyst. The product was then recovered by removal of the methyl alcohol and fractional distillation. Twenty-four g. of creosol was isolated, this product having a corrected boiling point of 220° C. at atmospheric pressure.

Example II

This example illustrates the preparation of 2,6-dimethoxy-4-methyl phenol by the process of this invention. In this example, 310 g. (2 mols) of 2,6-dimethoxy phenol were dissolved in 810 g. of 10% sodium hydroxide. The pH of the resultant dispersion of the sodium salt of 2,6-dimethoxy phenol was about 8.0. There was then added to this dispersion 300 g. of 38% formaldehyde solution. This reaction mixture was shaken at room temperature for 60 hours and then poured onto 2 kilograms of ice containing 150 g. of concentrated sulfuric acid. The mixed precipitate was filtered, washed, dried, and then recrystallized from benzene-alcohol. There was obtained 80 g. of 2,6-dimethoxy-4-hydroxymethyl phenol, melting point 128–129° C.

Twenty-five g. of 2,6-dimethoxy-4-hydroxymethyl phenol was dissolved in 300 g. of methanol. This solution along with 25 g. of a catalyst comprising 0.375% platinum on alumina was charged to a one liter rotating autoclave. The autoclave was sealed and pressured to 200 atmospheres with hydrogen. Then, it was heated to 200° C. and rotated for 4 hours. After cooling, the reaction mixture was filtered from the catalyst, the solvent was evaporated, and the residue distilled under vacuum. The desired 2,6-dimethoxy-4-methyl phenol distilled at 120–125° C. at 0.5 mm. On standing this product, in the quantity of 15 g., crystallized, and after recrystallization was found to have a melting point of 41° C.

Another 55 g. of the 2,6-dimethoxy-4-hydroxymethyl phenol was dissolved in 500 g. of methanol. This solution was charged to a one liter rotating autoclave along with 10 g. of a catalyst comprising 5% palladium on charcoal. The autoclave was sealed, pressured to 160 atmospheres with hydrogen, and heated to 160° C. at which temperature it was rotated for 5 hours. After cooling and release of pressure, the reaction mixture was filtered from the catalyst and the solvent evaporated therefrom. The residue was distilled under vacuum and the desired product isolated as a fraction boiling at 143–145° C. at 18 mm. From this distillate there was attained 40 g. of 2,6-dimethoxy-4-methyl phenol which had a melting point of 41° C. after recrystallization.

Example III

This example illustrates the preparation of 2,4,6-trimethylphenol (mesitol) by the process of the present invention. In this example, 108 g. (1 mol) of p-cresol was dissolved in a solution of 50 g. of sodium hydroxide and 200 g. of water. A precipitate of the sodium salt of p-cresol formed as a dispersion. To this solution was then added 215 g. of 38% formaldehyde. The total mixture was allowed to stand for 4 days at room temperature. During this time the pH of the solution varied from about 8.0 to about 9.0. After this period of time the sodium salt 2,6-hydroxymethyl-4-methylphenol was filtered from the solution. The 160 g. of crude product thus obtained was dispersed in 250 g. of water and 80 g. of glacial acetic acid in 250 ml. of water was added. Most of the sodium salt dissolved for a short period of time (a few seconds) and a new precipitate formed immediately. This was filtered, dried, recrystallized from ethyl acetate, and identified as 2,6-dihydroxymethyl-4-methylphenol.

Forty-two g. of 2,6-dimethyl-4-methylphenol was dissolved in 250 ml. of methanol. This solution along with 15 g. of a catalyst comprising 0.375% platinum on alumina was added to a rotating autoclave, which was sealed and pressured to 180 atmospheres with hydrogen. The autoclave was heated to 180° C. and rotated for 4 hours. The autoclave was then cooled, depressured, and the reaction products were filtered to remove the catalyst. After evaporation of the methanol, the product was obtained as a fraction boiling from about 104° to about 112° C. at 15–20 mm. On standing the product crystallized and had a melting point of 66–68° C. In this manner there was obtained 15 g. of 2,4,6-trimethylphenol or mesitol.

I claim as my invention:

1. A process for the production of methyl-substituted hydroxyaromatic compounds which comprises reducing a hydroxymethyl-hydroxyaromatic compound having a hydroxy group directly attached to a nuclear carbon atom with hydrogen at reduction conditions including a pressure of from about 50 atmospheres to about 200 atmospheres and a temperature of from about 100° to about 225° C. in the presence of a platinum group metal supported on a solid adsorbent, and recovering a methyl-substituted hydroxyaromatic compound.

2. A process for the production of methyl-substituted phenolic compounds which comprises reducing a hydroxymethyl-phenol with hydrogen at reduction conditions including a pressure of from about 50 atmospheres to about 200 atmospheres and a temperature of from about 100° to about 225° C. in the presence of a platinum group metal supported on a solid adsorbent, and recovering a methyl-substituted phenol compound.

3. A process for the production of methyl-substituted phenolic compounds which comprises reducing a hydroxymethylphenol with hydrogen at reduction conditions including a pressure of from about 50 atmospheres to about 200 atmospheres and a temperature of from about 100° to about 225° C. in the presence of alumina containing from about 0.01 weight percent to about 2.0 weight percent platinum, and recovering the methyl-substituted phenol compound.

4. A process for the production of creosol which comprises reducing vanillyl alcohol with hydrogen at reduction conditions including a pressure of from about 50 atmospheres to about 200 atmospheres and a temperature of from about 100° to about 225° C. in the presence of alumina containing from about 0.01 weight percent to about 2.0 weight percent platinum, and recovering creosol.

5. A process for the production of 2,6-dimethoxy-4-methyl-phenol which comprises reducing 2,6-dimethoxy-4-hydroxymethyl-phenol with hydrogen at reduction conditions including a pressure of from about 50 atmospheres to about 200 atmospheres and a temperature of from 100° to about 225° C. in the presence of alumina containing from about 0.01 weight percent to about 2.0 weight percent platinum, and recovering 2,6-dimethoxy-4-methyl-phenol.

6. A process for the production of mesitol which comprises reducing 2,6-dihydroxymethyl-4-methyl-phenol with hydrogen at reduction conditions including a pressure of from about 50 atmospheres to about 200 atmospheres and a temperature of from about 100° to about 225° C. in the presence of alumina containing from about 0.01 weight percent to about 2.0 weight percent platinum, and recovering mesitol.

References Cited in the file of this patent
UNITED STATES PATENTS

| | | |
|---|---|---|
| 2,401,608 | Burawoy | June 4, 1946 |
| 2,427,337 | Abbott et al. | Sept. 16, 1947 |
| 2,524,096 | Wood | Oct. 3, 1950 |
| 2,682,562 | Wender et al. | June 29, 1954 |

OTHER REFERENCES

Sabatier et al.: Comptes Rendus, vol. 158 (1914), p. 762.

Straus et al.: Ann., vol. 439 (1924), p. 312.

Papa et al.: Jour. Organic Chem., vol. 7 (1942), pp. 587–90.